April 20, 1965  E. R. LE CLEAR  3,179,882
SYSTEM FOR DETERMINING THE PERCENTAGE "ON" TIME OF A RANDOM
SIGNAL WITH RESPECT TO A PREDETERMINED PERIOD
Filed June 30, 1960
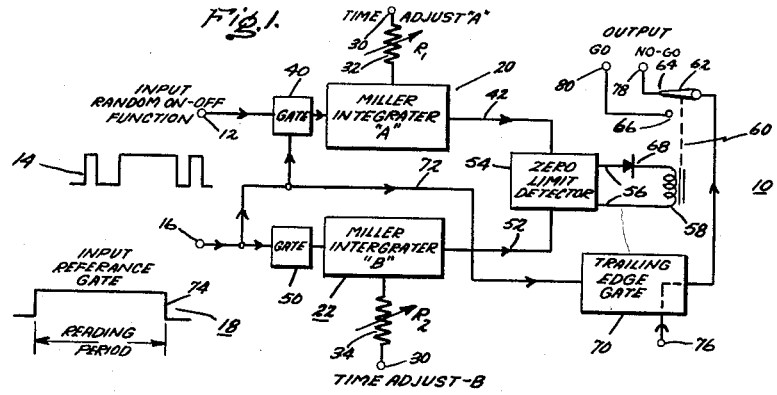
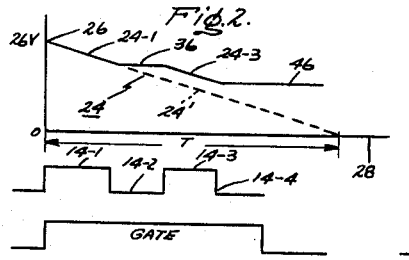
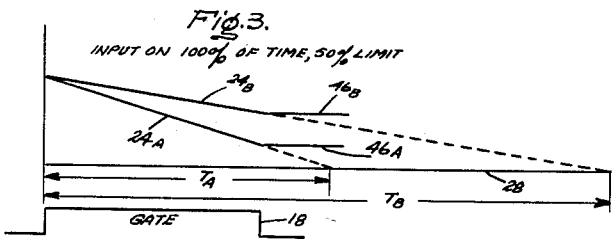
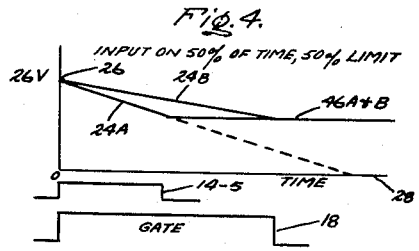
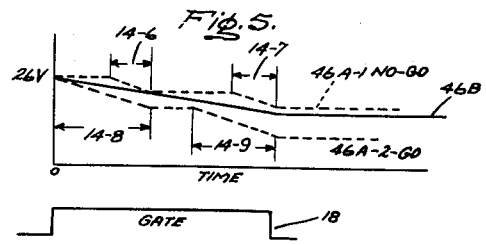
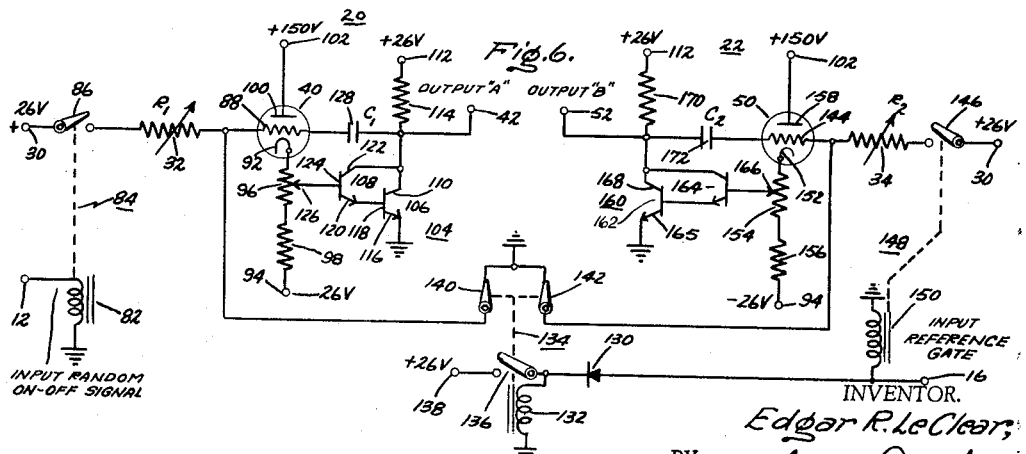
INVENTOR.
Edgar R. LeClear;
BY
Gust & Orish
Attorneys.

United States Patent Office 3,179,882
Patented Apr. 20, 1965

3,179,882
SYSTEM FOR DETERMINING THE PERCENTAGE "ON" TIME OF A RANDOM SIGNAL WITH RESPECT TO A PREDETERMINED PERIOD
Edgar R. Le Clear, Fort Wayne, Ind., assignor to International Telephone and Telegraph Corporation
Filed June 30, 1960, Ser. No. 39,890
6 Claims. (Cl. 324—68)

This invention relates generally to a system for determining whether an input signal subject to change between "on" and "off" conditions has been cumulatively in a given conidtion for a predetermined portion of a predetermined period, and more particularly to a system for determining whether a signal which is pulsed "on" and "off" in random fashion has been cumulatively "on" for a predetermined percentage of a total given time.

In the testing of certain electronic apparatus in which a signal is pulsed "on" and "off" in random fashion, it is desirable to determine whether the random function input signal has been cumulatively "on" for a predetermined percentage of a given time interval. To the best of the present applicant's knowledge, such a determination has in the past been possible only by measuring the total "on" time of the signal over the desired period and then calculating the "on" time percentage. It is therefore an object of my invention to provide a system for automatically making such a determination and for providing a "GO" and "NO GO" type indication as to whether or not the cumulative "on" time of the input signal over the desired period is within desired limits.

My invention, in its broader aspects, provides a first input circuit for connection to the source of an input signal subject to change between "on" and "off" conditions and a second input circuit for connection to a source of gating signals respectively having a duration corresponding to the desired comparison period. Electrically energizable means are provided for providing a first output signal which is linearly proportional to the total time the means is energized and the means is coupled to the first and second input circuits and energized responsive to the coincidence of the input signal and one gating signal so that the first output signal is proportional to the total time the input signal is "on" during the occurrence of the gating signal. Other electrically energizable means are provided coupled to the second input circuit and energized responsive to the one gating signal for providing a second output signal which is linearly proportional to the total duration of the one gating signal and means are provided for comparing the output signals at the end of the one gating signal.

In the preferred embodiment of my invention, the electrically energizable means comprise first and second integrating circuits for respectively providing first and second direct current output signals which vary linearly in sawtooth fashion to a predetermined level responsive respectively to continuous energization from a source of direct current potential for first and second predetermined times, the first and second integrating circuits respectively including means for respectively varying the time so that the second time is longer than the first time by a predetermined amount. The first and second integrating circuits further respectively include means for maintaining the respective output signals at the levels reached when the circuits are respectively deenergized prior to the output signals reaching the predetermined level, the circuits further resuming the linear variation of their respective output signals toward the predetermined level upon reenergization thereof. In the preferred embodiment, first gating means are provided coupled to the first and second input circuits for coupling the direct current source to the first integrating circuit thereby to energize the same responsive to the input signal being "on" coincident with the one gating pulse so that the final level of the first output signal at the end of the one gating pulse is proportional to the total time the input signal is "on" during the occurrence of the one gating signal. Second gating means are also provided coupled to the second input circuit for coupling the direct current source to the second integrating circuit for energizing the same responsive to the one gating pulse so that the final level of the second output signal at the end of the gating signal is proportional to the duration thereof. Voltage comparator means are provided coupled to the first and second integrating circuits for comparing the final levels of the output signals in response to an energizing signal and another gating means is provided coupling the second input circuit and the comparator means for energizing the same responsive to the trailing edge of the one gating signal.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram schematically illustrating the system of my invention;

FIGS. 2 through 5, inclusive, are diagrams illustrating the run down characteristics of the integrating circuits of the system of FIG. 1 which are useful in explaining my invention; and FIG. 6 is a schematic diagram illustrating a specific embodiment of my invention.

Referring now to FIG. 1, the system of my invention, generally identified at 10, comprises a first input circuit 12 adapted to be coupled to the source of the input signal 14 which is pulsed "on" and "off" in random fashion, as shown. Another input circuit 16 is provided adapted to be connected to a source of reference gate pulses 18 respectively having a duration equal to the desired comparison period, such as for example ten seconds.

Two integrating circuits 20 and 22 are provided, each being of the type which provides a direct current output signal 24 as shown in FIG. 2, which "runs-down" linearly in sawtooth fashion from a first predetermined upper level 26, which in the specific embodiment of my invention is 26 volts, down to a lower predetermined level 28, which may be zero, over a predetermined time T responsive to continuous energization from a terminal 30 of a voltage source of direct current potential, which, as indicated, in the specific embodiment of my invention is 26 volts. Integrating circuits 20 and 22 respectively include variable resistance elements 32 and 34 coupled in series between terminal 30 of a source of voltage and the respective integrating circuits 20 and 22 for selectively varying the "run-down" time T. Integrating circuits 20 and 22 are further of the type which respectively maintain their output signals essentially constant at the level reached when they are deenergized prior to the output signal 24 reaching the lower level 28, as shown at 36 in FIG. 2. Integrators 20 and 22 further resume linear run-down of their respective output signals toward the predetermined level 28 upon subsequent reenergization as shown at 24-3 in FIG. 2. In the preferred embodiment of my invention, I employ integrating circuits of the type referred to as "Miller integrators"; the "Miller integrator" is not my invention, per se, being well known in the art.

In accordance with my invention, integrating circuit 20, identified as A is set by means of variable resistance 32, identified as $R_1$, so that its output signal 24A runs down in time $T_A$ as shown in FIG. 3, and integrating circuit 22, identified as B is set by means of variable resistance 34, identified as $R_2$ so that its output signal 24B runs down in a greater length of time $T_B$. In accordance with my invention, the run-down time of integrating circuit 20(A) is set to be less than the run-down time of integrating circuit 22(B) by the same percentage as the desired comparison of the "on" time of the random function input signal 14 with reference to the duration of the gating pulse 18. Thus, as shown in FIG. 3, where it is desired to determine whether the input signal 14 is cumulatively "on" for at least 50% of the period determined by the gating signal 18, the run-down time $T_A$ of integrating circuit 20 is set at 50% of the run-down time $T_B$ of integrating circuit 22, as shown in FIG. 3.

In accordance with my invention, the random "on-off" function in input circuit 12 and the reference gate input circuit 16 are coupled to integrating circuit 20 by gate 40 so that integrating circuit 20 is energized from terminal 30 of a voltage source responsive to the presence of both random function input signal 14 and gating signal 18. Thus, referring additionally to FIG. 2, it will be seen that when gate signal 18 is impressed upon gate 40 and input signal 14 is "on" as at 14-1, integrating circuit 20 is energized from terminal 30 of a voltage source, thus providing a direct current output signal in its output circuit 42 which follows run-down characteristic 24-1. When input signal is pulsed off, as at 14-2, gate circuit 40 deenergizes integrating circuit 20, thus causing the output signal in output circuit 42 to remain essentially constant, as at 36. When the input signal 14 is pulsed on again, as at 14-3, gate signal 18 is still present and thus gate circuit 40 again energizes integrating circuit 20 so that it again runs down, as at 24-3. When input signal 14 is subsequently pulsed off, as at 14-4, the output signal in output circuit 42 of integrating circuit 20 again remains constant at final level 46. It will be understood that the dashed line 24' shows the run-down characteristic of the output signal when integrating circuit 20 is continuously energized for time T.

Gate signal input circuit 16 is coupled to integrating circuit 22 by gate circuit 50 so that integrating circuit 22 is energized from terminal 30 of the voltage source through variable resistance 34 during the occurrence of the gate pulse 18, thereby providing in its output circuit 52 a direct current signal having a linear run-down characteristic as shown at 24(B) in FIG. 3.

Referring now particularly to FIG. 3, assuming that integrating circuit 20(A) is set to have a run-down time $T_A$ which is 50% of the run-down time $T_B$ of the integrating circuit 22(B), and assuming that input signal 14 is "on" continuously during the occurrence of gate pulse 18, it will be seen that the output signal in output circuit 42 of integrating circuit 20(A) will follow run-down characteristic 24(A) during the occurrence of gate pulse 18 and when gate pulse 18 is terminated, the output signal of integrating circuit 20 will then remain essentially constant at final level 46(A). Likewise, the output signal of integrating circuit 22(B) in output circuit 52 will follow run-down characteristic 24(B) during the occurrence of the gate pulse 18, and when the gate pulse 18 is terminated, the output signal of integrating circuit 22 will then have an essentially constant output level 46(B). It will be observed in FIG. 3 that the final output signal level 46(B) of integrating circuit 22 is twice the final output level 46(A) of integrating circuit 20.

Referring now to FIG. 4, with integrating circuits 20 and 22 set to have the same relative run-down times $T_A$ and $T_B$ as in FIG. 3, i.e., with the integrating circuit 20 having a normal rundown time $T_A$ half the normal run-down time $T_B$ of integrating circuit 22, it will be observed that with input signal 14 "on" during the first half of gate 18, as at 14-5, the final level 46(A) of the output signal of integrating circuit 20 will be equal to the final level 46(B) of the output signal of integrating circuit 22.

Referring now to FIG. 5, in which again the run-down time $T_A$ of integrating circuit 20 is set to be 50% of the run-down time $T_B$ of integrating circuit 22, it will be observed that with input signal 14 "on" during intervals 14-6 and 14-7, which cumulatively represent approximately 40% of the duration of gate pulse 18, the final level of output signal of integrating circuit 20 in its output circuit 42, identified as 46(A)-1 is higher than the final level 46(B) of the output signal of integrating circuit 22 and its output circuit 52, and in the specific embodiment of my invention, this is taken as a "NO GO" indication, i.e., with input signal 14 "on" less than 50% of the time during the period of gate pulse 18. It will be seen, however, that with input signal 14 "on" during intervals 14-8 and 14-9 which cumulatively represent approximately 80% of the period of gate pulse 18, the final level of the output signal of integrator 20, identified as 46(A)-2 is less than the final output level 46(B) of integrating circuit 22, this being taken as a "GO" indication, i.e., indicating that input sgnal 14 was "on" over 50% of the time during the period of gate signal 18.

In accordance with my invention, I compared the final output signal levels 46(A) and (B) respectively appearing in the output circuits 42 and 52 of the integrating circuits 20 and 22 at the end of the gate pulse 18 in order to determine whether the input signal 14 has been cumulatively "on" a predetermined portion of the period of gate pulse 18 determined by setting of the relative run-down periods $T_A$ and $T_B$ of integrating circuits 20 and 22. In the embodiment illustrated in FIG. 1, I employ a zero limit detector 54 which may be a conventional differential amplifier. The output circuit 56 of zero limit detector 54 is coupled to energize operating coil 58 of relay 60 having contacts 62 movable between a first position 64 when coil 58 is deenergized and a second position 66 when coil 58 is energized. A diode 68 is serially connected with operating coil 58 so that coil 58 senses a difference in the levels of output signals 46(A) and 46(B) in one direction; in the illustrated embodiment, diode 68 is polarized to sense the condition in which the level 46(B) is greater than the level 46(A) thus indicating that the random function input signal 14 has been cumulatively "on" at least 50% of the period of gating signal 18.

Zero limit detector 54 continuously senses the difference between the output signal levels of output circuits 42 and 52 of integrating circuits 20 and 22, however, as indicated, it is desired to provide an indication of the difference between the final output signal levels 46(A) and 46(B) at the end of the gating pulse 18. For this purpose, I provide a trailing edge gating circuit 70 coupled to the gating signal input circuit 16 by connection 72 and triggered by the trailing edge 74 of gating pulse 18 to connect relay contacts 62 to terminal 76 of a suitable source of potential. Contact position 64 is connected to "NO GO" indicating circuit 78 and contact position 66 is connected to "GO" indicating circuit 80. Thus, if at the end of gating pulse 18, the output signal level 46(A) of integrating circuit 20 is above the output signal level 46(B) of integrating circuit 22 as at 46(A)-1 diode 68 will block the resulting difference signal provided by the zero limit detector 54 so that relay operating coil 58 will not be energized and relay 60 will not be picked up. Thus, at the instant gate signal 18 is terminated, trailing edge 74 will actuate trailing edge gate 70 to connect contacts 62 to terminal 76 of the potential source and since the relay 60 will not be picked up, contacts 62 will connect terminal 76 of the same source to the "NO GO" circuit 78, thereby providing a voltage thereon indicating that the random function input signal 14 was "on" less than 50% of the period of gate pulse 18. On the other hand, if the final output signal level 46(A) of integrating circuit 20 is less than final output signal level 46(B) of integrating circuit 22, as at 46(A)-2 thereby indicating that the random function input signal 14 was "on" cumulatively more than half the period of gate pulse 18, operating coil 58 will be energized thereby to pick up relay 60 moving contact 62 to position 66 and thus trailing edge gate 70 in response to trailing edge 74 of gating pulse 18 will connect terminal 76 of the source to the "GO" circuit 80 thereby providing a voltage thereon indicating that the random function input signal 14 was "on" more than 50% of the period of gate pulse 18.

It will be readily apparent that the polarization of diode 68 may be reversed, thereby to provide an indication when the random on-off function signal 14 is cumulatively "on" less than 50% of the period of gating pulse 18 and that the desired comparison limit may be varied between a percentage approaching zero and a percentage approaching 100% by adjustment of variable resistance 32, thereby to vary the normal run-down time $T_A$ of integrating circuit 20. It will also be readily apparent that any conventional voltage comparator may be employed in lieu of zero limit detector 54 in order to provide a signal for energizing operating coil 58 when the output signal levels 46(A) and 46(B) are within predetermined limits.

Referring now to FIG. 6, there is shown a specific embodiment of integrating circuits 20 and 22 with the accompanying gate circuits 40 and 50. Here, input circuit 12 which receives input signal 14 which is pulsed "on" and "off" in random fashion, has operating coil 82 of relay 84 coupled in parallel to ground, as shown, so that the random "on-off" input pulses 14 respectively energize coil 82, thereby to close and open contacts 86. Contacts 86 are serially connected with variable resistance 32 between the terminal 30 of a source of positive direct current potential, which may be +26 volts, and control grid 88 of gate tube 40. Cathode 92 of tube 40 is connected to terminal 94 of a suitable source of reference potential, which may be —26 volts, by serially connected potentiometer 96 and resistor 98. Plate 100 of tube 40 is connected to terminal 102 of a suitable source of positive plate potential, such as +150 volts.

An amplifier 104 is provided comprising transistors 106 and 108. Transistor 106 has its collector 110 connected to terminal 112 of a suitable source of positive potential, such as +26 volts by resistor 114, and has its emitter 116 connected to ground, as shown. Base 118 of transistor 106 is directly connected to emitter 120 of transistor 108, which has its collector 122 directly connected to collector 110 of transistor 106, and which has its base 124 connected to adjustable element 126 of potentiometer 96. Capacitor 128, identified as $C_1$, is connected between control grid 88 of tube 40 and collector 110 of transistor 106. Collector 110 of transistor 106 is directly connected to output circuit 42.

Input circuit 16 which receives the gating pulse 18 is coupled to ground by serially connected diode 130 and operating coil 132 of relay 134. Relay 134 has sealing contacts 136 which connect terminal 138 of a suitable source of potential, such as +26 volts, to the side of operating coil 132 remote from ground so that relay 134 when energized seals itself in to the source. Relay 134 has contacts 140 and 142, contact 140 connecting control grid 88 of gate tube 40 to ground when coil 132 is deenergized. It will thus be seen that when the gate pulse 18 is received at input circuit 16, relay coil 132 is energized, thereby closing contact 136 and opening contact 140. Prior to opening of contact 140, control grid 88 of gate tube 40 is tied directly to ground by contact 140. With cathode 92 of gate tube 40 connected to a negative source of potential, tube 40 will then conduct at a fixed rate developing a voltage drop across potentiometer 96 a portion of which is applied to base 124 of transistor 108, thereby to determine the conduction of transistors 106 and 108 to establish the initial potential level 26 of output terminal 42, and with capacitor 128 being charged to an initial level. With contact 140 opened responsive to picking up of relay 134, gate tube 40 continues to conduct at the same rate, however, grid 88 is no longer clamped to ground and can thus receive positive-going pulses responsive to opening and closing of contacts 86 of relay 84 in turn responsive to input pulses 14. Closing of contacts 86 responsive to picking up of relay 84 impresses the +26 volt source of potential through variable resistance 32 upon grid 88 of gate tube 40, thereby increasing its conduction and in turn increasing the conduction of amplifier 104, thereby increasing the voltage drop across resistance 114 and lowering the potential of output terminal 42, the rate of increase of the voltage drop across resistance 114 and reduction of the potential of output terminal 42 being determined by the constants of capacitor 128 and resistor 32. It will be observed that when contacts 86 are opened responsive to the pulsing "off" of signal 14 while contacts 140 are opened due to the presence of a gate signal 18, results in disconnection of grid 88 from the +26 volt source so that the grid potential remains at the level established by the charge on capacitor 128, and so that the output potential at the output terminal 42 thus remains at the same level until contacts 86 are again closed responsive to reception of another input pulse 14.

Integrator circuit 22 is substantially identical to integrator circuit 20. Here, control grid 144 of gate tube 50 is connected to terminal 30 of the +26 volt source by contacts 146 of relay 148 and variable resistance 34. Grid 144 is also normally connected to ground by contacts 142 of relay 134. Contacts 146 of relay 148 are actuated by operating coil 150 connected between reference gate input circuit 16 and ground, as shown. Cathode 152 of gate tube 50 is coupled to terminal 94 of a —26 volt source by serially connected potentiometer 154 and resistor 156. Plate 158 of gate tube 50 is connected to terminal 102 of a source of +150 volts. Amplifier 160 is provided comprising transistor 162 and 164 coupled in the same manner as transistors 106 and 108 to adjustable element 166 of potentiometer 154. Collector 168 of transistor 162 is connected to terminal 112 of a source of +26 volts by resistor 170. Collector 168 of transistor 162 is also connected to control grid 144 of gate tube 50 by capacitor 172, identified as $C_2$ and to output terminal 52. The mode of operation of integrating circuit 22 is identical to that of integrating circuit 20. Thus, receipt of a gate pulse 18 at input circuit 16 energizes operating coil 150 of relay 148, thereby to close contacts 146 and also energizes operating coil 132 of relay 134 to open contacts 142 which when closed connect grid 144 of gate tube 50 to ground. Output signal 46B is thus provided at output terminal 52 having a run-down characteristic 24B determined by the constants of resistor 34 ($R_2$) and capacitor 172 ($C_2$). Termination of the gating pulse 18 deenergizes operating coil 150 of relay 148, thereby opening contacts 146 to disconnect integrating circuit 22 from terminal 30 of a voltage source, thereby providing the essentially constant output signal level 46B.

It will be readily apparent that the expression $$\frac{R_1C_1}{R_2C_2} = \frac{\text{total random time}}{\text{total gate time}}$$

for equal output voltage levels at the end of gate pulse 18. Thus it will be seen that in the example given in FIGS. 3, 4 and 5, with the total time of input pulses 14 to be at least 50% of the time of the gate pulse 18, and with $C_1$ and $C_2$ assumed to be equal, $R_1$, i.e., variable resistance 32, is set to have a resistance value one-half that of $R_2$, i.e., variable resistance 34. It will further be readily seen that adjustment of $R_1$ and/or $R_2$ will provide other total random time/total gate time ratios, as desired.

In a specific embodiment of my invention in accordance with FIG. 6, the following component values were employed:

| | |
|---|---|
| Resistors $R_1$ and $R_2$ (total resistance) | 2.5 megohms. |
| Potentiometers 96 and 154 (total resistance) | 1,000 ohms. |
| Resistors 98 and 156 | 3,300 ohms. |
| Gate tubes 40 and 50 | JAN 6111. |
| Capacitors $C_1$ and $C_2$ | 8.0 microfarads. |
| Resistors 114 and 170 | 1,000 ohms. |
| Transistors 106, 108, 152 and 154 | 2N335. |
| Diode 130 | 1N457. |

It will be readily apparent that the specific integrator circuits shown in FIG. 6 are illustrative only, and that other integrating circuits may be employed so long as they provide an output voltage which varies linearly in sawtooth fashion proportional to the time during which the integrating circuit is energized, the output voltage being maintained at an essentially constant level responsive to deenergization of the integrating circuit and resuming its linear variation responsive to subsequent reenergization.

While I have described above the principles of my invention in connection with specific apparatus, it is to be clearly understood that this description is made only by way of example and not as a limitation to the scope of my invention.

What is claimed is:

1. A system for determining whether an input signal subject to change between "on" and "off" conditions has been cumulatively in a given condition for a predetermined portion of a predetermined period, said system comprising: a first input circuit for connection to the source of said input signal; a second input circuit for connection to a source of a gating signal having a duration corresponding to said period; electrically energizable means for providing a first output signal which is linearly proportional to the total time said means is energized, said means being coupled to said first and second input circuits and energized responsive to coincidence of said input signal and said gating signal whereby said first output signal is proportional to the total time said input signal is "on" during the occurrence of said gating signal; electrically energizable means coupled to said second input circuit and energizable responsive to said gating signal for providing a second output signal which is linearly proportional to the total duration of said gating signal; and means for comparing said output signals at the end of said gating signal.

2. A system for determining whether an input signal subject to change between "on" and "off" conditions has been cumulatively in a given condition for a predetermined portion of a predetermined period, said system comprising: a first input circuit for connection to the source of said input signal; a second input circuit for connection to a source of a gating signal having a duration corresponding to said period; first and second electrically energizable means for respectively providing first and second output signals which vary linearly in proportion to the total time said first and second means are energized, said first and second mean respectively maintaining said output signals at the levels reached when said first and second means are respectively deenergized, said first means resuming said linear variation of said first output signal upon reenergization thereof; said first means being coupled to said first and second input circuits and energized responsive to coincidence of said input signal and said gating signal whereby the final level of said first output signal at the end of said gating signal is proportional to the total time said input signal is "on" during the occurrence of said gating signal; said second means being coupled to said second input circuit and energized responsive to said gating signal whereby the final level of said second output signal at the end of said gating signal is proportional to the duration thereof; and means for comparing the final levels of said output signals.

3. A system for determining whether an input signal subject to change between "on" and "off" conditions has been cumulatively in a given condition for a predetermined portion of a predetermined period, said system comprising: a first input circuit for connection to the source of said input signal; a second input circuit for connection to a source of a gating signal having a duration corresponding to said period; first and second electrically energizable means for respectively providing first and second output signals which vary linearly to a predetermined level responsive respectively to continuous energization for first and second predetermined times, said second predetermined time being longer than said first predetermined time, said first and second means respectively including means for maintaining said output signals at the levels reached when said first and second means are respectively deenergized prior to said output signals reaching said predetermined level, said first means resuming said linear variations of said first output signal toward said predetermined level upon reenergization thereof; first gating means coupling said first and second input circuits to said first means for energizing the same responsive to coincidence of said input signal and said gating signal whereby the final level of said first output signal at the end of said gating signal is proportional to the total time said input signal is "on" during the occurrence of said gating signal; second gating means coupling said second input circuit to said second means for energizing the same responsive to said gating signal whereby the final level of said second output signal at the end of said gating signal is proportional to the duration thereof; means coupled to said first and second means for comparing the levels of said output signals; means coupled to said comparing means for establishing an indicating circuit responsive to the level of one of siad output signals being above the level of the other output signal; and means coupled to said second input circuit and responsive to the trailing edge of said one gating signal for energizing said indicating circuit at the end of said one gating signal.

4. A system for determining whether an input signal which is pulsed "on" and "off" in random fashion has been cumulatively "on" for a predetermined portion of a predetermined period, said system comprising: a first input circuit for connection to the source of said input signal; a second input circuit for connection to a source of a gating signal pulse having a duration corresponding to said period; first and second integrating circuits for respectively providing first and second direct current output signals which vary linearly in sawtooth fashion to a predetermined level responsive respectively to continuous energization from a source of direct current for predetermined run-down times, said first and second circuits respectively including means for selectively varying said run-down times so that the run-down time of one of said circuits is longer than the run-down time of the other of said circuits by a predetermined amount, said first and second circuits respectively including means for respectively maintaining said output signals at the levels reached when said first and second circuits are respectively deenergized prior to said output signals reaching said predetermined level, said first circuit resuming said linear variation of said first output signal toward said predetermined level upon reenergization thereof; first gating means coupled to said first and second input circuits for coupling said direct current source to said first circuit thereby to energize the same responsive to said input signal being "on" coincident with said gating pulse whereby the final level of said first output signal at the end of said gating pulse is proportional to the total time said input signal is "on" during the occurrence of said gating signal; second gating means coupled to said second input circuit for coupling said direct current source to said second circuit for energizing the same responsive to said gating pulse whereby the final level of said second output signal at the end of said one gating signal is proportional to the duration thereof; voltage comparator means coupled to said first and second circuits for comparing the voltage levels of said output signals; means coupled to said comparator means for establishing a "GO" indicating circuit responsive to the level of one of said output signals being above the level of the other of said output signals and a "NO-GO" indicating circuit responsive to the level of said other output signal being above the level of said one output signal; and another gating means coupling said second input circuit and said indicating circuits for energizing the same responsive to the trailing edge of said gating pulse.

5. The combination of claim 4 wherein said integrating circuits are Miller integrators.

6. The combination of claim 4 wherein said comparator means comprises a zero limit detector having an output circiut and providing therein another output signal responsive to a predetermined difference in a predetermined direction between said first and second output signals; and wherein said circuit establishing means comprises a relay having a coil coupled in said detector output circuit and energized responsive to said other output signal, said relay having contacts movable between first and second positions responsive to energization of said coil for respectively establishing said "GO" and "NO-GO" circuits, said other gating means comprising a trailing edge gating circuit coupling said contacts to a source of potential responsive to the trailing edge of said gating pulse.

References Cited by the Examiner
UNITED STATES PATENTS

| | | | |
|---|---|---|---|
| 2,628,348 | 2/53 | Page | 324—68 X |
| 2,814,725 | 11/57 | Jacobs et al. | 324—68 X |
| 2,928,083 | 3/60 | Kernan | 324—68 |
| 3,013,208 | 12/61 | Voznak | 324—68 |

WALTER L. CARLSON, *Primary Examiner.*

SAMUEL BERNSTEIN, *Examiner.*